United States Patent [19]

Lemieux et al.

[11] 4,430,910

[45] Feb. 14, 1984

[54] CLUTCH CONTROL VALVE FOR AN AUTOMATIC TRANSMISSION CONTROL CIRCUIT

[75] Inventors: George E. Lemieux, Livonia; John E. Cochran, Dearborn Heights; Robert S. Anderson, South Lyon, all of Mich.

[73] Assignee: Ford Motor Company, Dearborn, Mich.

[21] Appl. No.: 271,063

[22] Filed: Jun. 8, 1981

[51] Int. Cl.³ .............................................. B60K 41/16
[52] U.S. Cl. .................................... 74/867; 74/752 C
[58] Field of Search .............. 74/869, 868, 867, 752 C

[56] References Cited

U.S. PATENT DOCUMENTS

| 2,875,634 | 3/1959 | Gelenius et al. | 74/868 |
| 3,309,939 | 3/1967 | Pierce, Jr. | 74/869 |
| 4,125,038 | 11/1978 | Hiramatsu | 74/869 |

FOREIGN PATENT DOCUMENTS

| 1680650 | 10/1964 | Fed. Rep. of Germany | 74/868 |
| 52-14174 | 2/1977 | Japan | 74/867 |
| 52-39067 | 3/1977 | Japan | 74/867 |
| 56-138553 | 10/1981 | Japan | 74/867 |

*Primary Examiner*—Allan D. Herrmann
*Assistant Examiner*—D. Wright
*Attorney, Agent, or Firm*—Donald J. Harrington; Keith L. Zerschling

[57] ABSTRACT

A clutch pressure modifier valve for an automatic control circuit for a power transmission mechanism in a vehicle driveline wherein provision is made during ratio changes that requires engagement of a fluid pressure operated transmission clutch for modifying a clutch engagement pressure to compensate for the effect of centrifugal pressure build up in the pressure chamber of the clutch structure due to rotation of the clutch at high speeds during a shift interval whereby the timing of the clutch engagement is relatively independent of the rotary speed of the clutch during engagement and whereby the torque capacity of the clutch more closely matches the torque requirements of the driveline during ratio changes.

11 Claims, 10 Drawing Figures

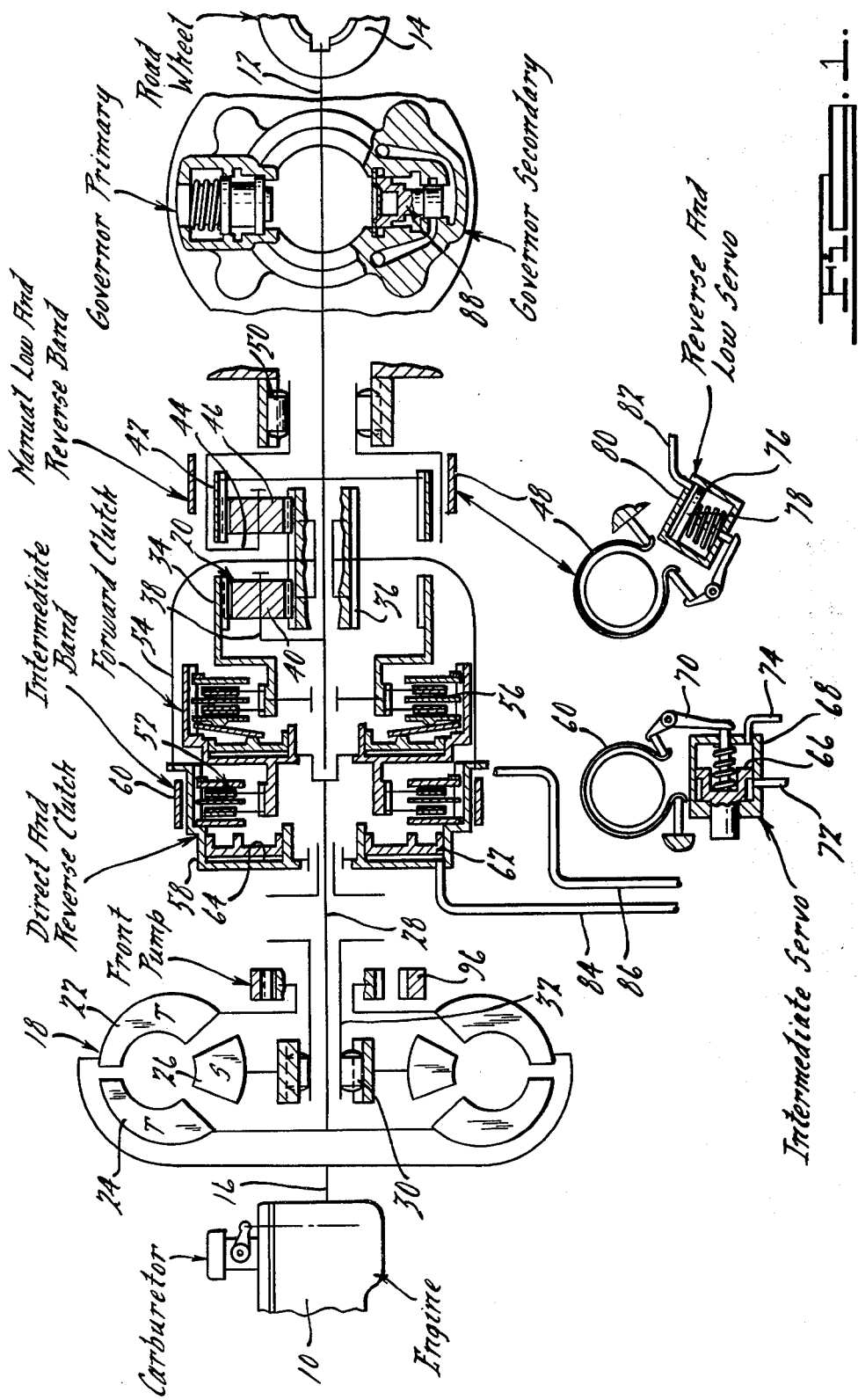

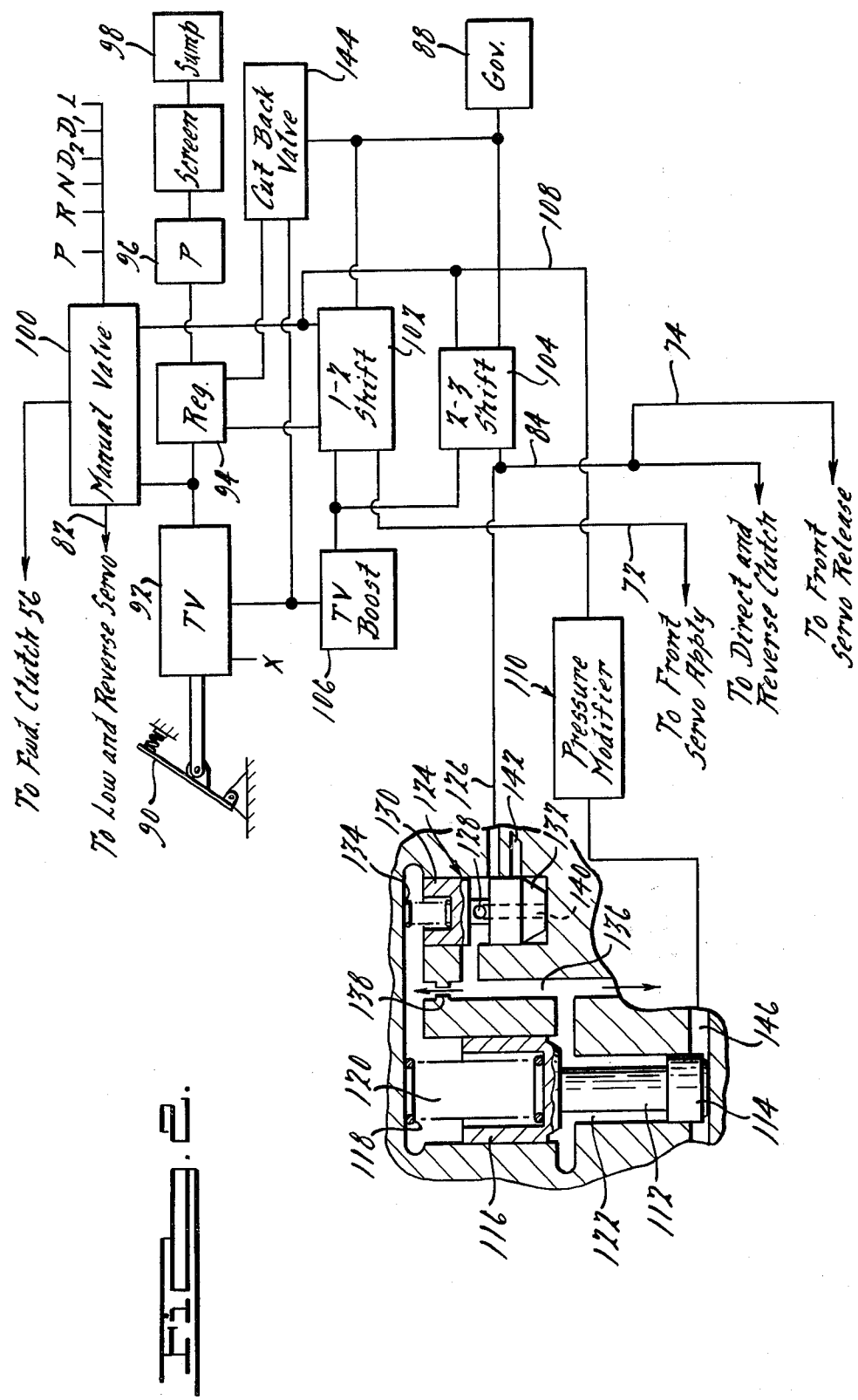

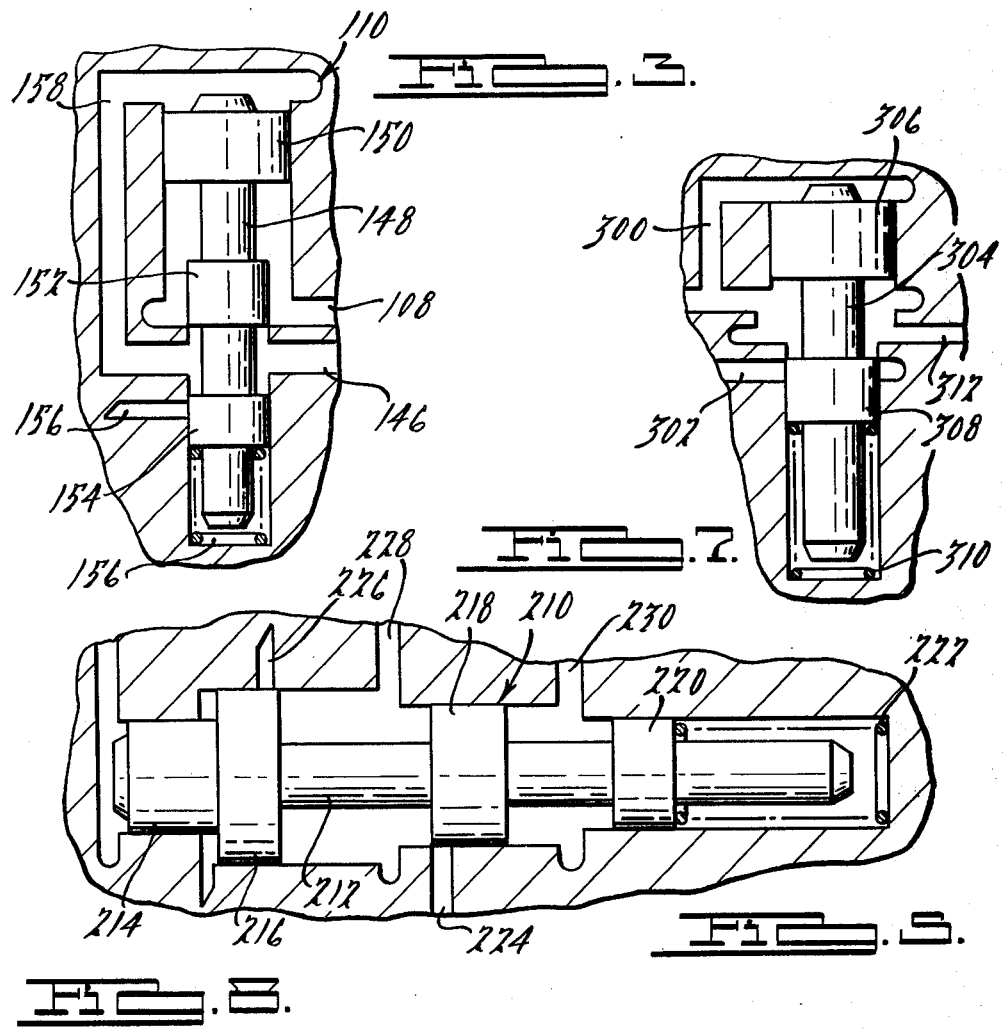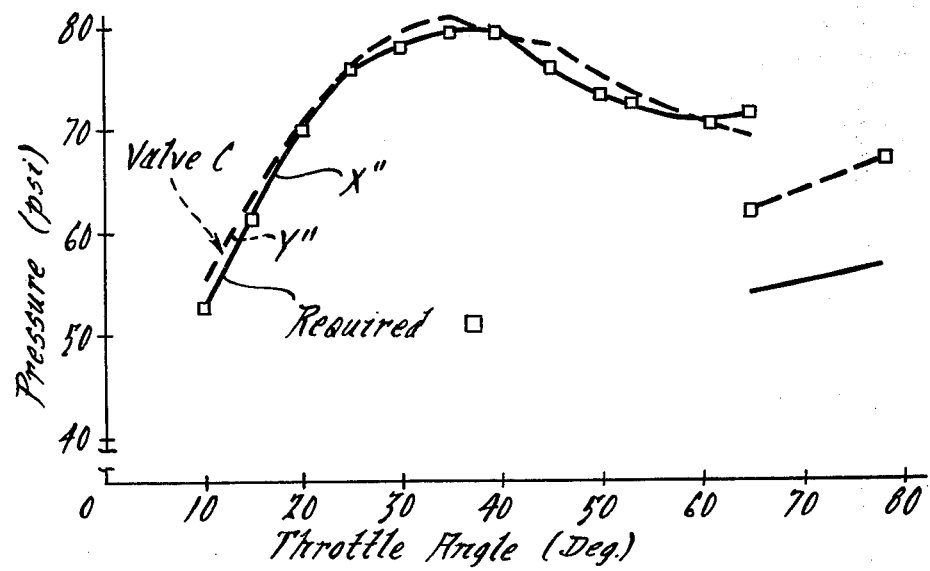

CLUTCH CONTROL VALVE FOR AN AUTOMATIC TRANSMISSION CONTROL CIRCUIT

GENERAL DESCRIPTION OF THE INVENTION

Our invention comprises improvements in an automatic control valve circuit of the kind shown, for example, in U.S. Pat. No. 3,309,939. The improvements of my invention are adapted to be used in an automatic power transmission in an automotive vehicle driveline for effecting ratio changes in the torque delivery paths between an internal combustion engine and the vehicle traction wheels. The transmission comprises multiple ratio gearing and the relative motion of one gear element of the gearing with respect to another is controlled by pressure operated clutches and brakes thereby establishing the multiple ratios.

A control system for actuating and releasing the clutches and brakes comprises a pressure source such as an engine driven positive displacement pump and a pressure regulator for maintaining the desired pressure level. The pressure source is conected to the clutches and brakes through valve circuitry that includes shift vavle elements that respond to speed governor pressure and an engine torque sensitive pressure. Circuit pressure made available to the clutches and brakes is increased when engine torque is increased and is cut back or reduced to a lower level when the vehicle speed increases. This causes the clutch and brake pressures to vary in magnitude depending upon the changes in the torque due to changes in engine speed and throttle setting and due to the changes in the effective torque ratio of the hydrokinetic torque converter used with the gearing as the speed ratio in the converter changes.

In addition to this circuit pressure modification, it is usual practice to use the fluid pressure accumulator and a clutch pressure capacity modulator valve to effect a gradual pressure build up in the appropriate transmission clutch upon a ratio change. This cushions the application of the clutch and improves the shift quality by reducing or eliminating harsh inertia forces.

When a ratio change of this kind occurs at high speeds as the clutch structure is rotating at a relatively high speed, centrifugal pressure tends to build up in the clutch pressure working chamber. This adversely affects the shift quality.

The improved valve mechanism of our invention compensates for the centrifugal clutch pressure build up and makes it possible to precisely calibrate the clutch timing control valve to effect optimum shift quality regardless of the presence of a centrifugal pressure build up in the rotating clutch pressure chamber. The valve elements that produce this centrifugal pressure compensation are located in the same valve circuit that controls the ratio shifts and it is not necessary, as in the case of some prior art arrangements, to locate a separate pressure chamber in the clutch structure to develop a force that counterbalances or opposes the centrifugal pressure forces in the clutch structure. This eliminates the expense of providing additional valve structure and reduces the space for the clutch assembly for any given clutch torque capacity.

BRIEF DESCRIPTION OF THE FIGURES OF THE DRAWINGS

FIG. 1 shows in schematic form a transmission gearing system that is adapted to be controlled by the improved valve circuit of the invention.

FIG. 2 shows in schematic form a valve circuit embodying the improvements of the invention which is adapted to control the clutches and brakes for a transmission of the kind shown in FIG. 1.

FIG. 3 is a detailed view of a timing valve for use in the circuit of FIG. 2.

FIG. 6 is a chart similar to FIG. 4 but it shows the variations in clutch pressure during a shift interval when the valve circuit includes a valve of the kind shown in FIG. 5 rather than a valve of the kind shown in FIG. 3.

FIG. 7 is a governor pressure booster valve for use in combination with the valve of FIG. 5 to develop a modified governor pressure for changing the modulated output pressure for the valve of FIG. 5.

FIG. 8 is a chart similar to the chart of FIG. 4 but it includes a plot of the clutch pressures during a shift interval when the valve circuit includes the valve of FIG. 7 combined with the valve of FIG. 5.

PARTICULAR DESCRIPTION OF THE INVENTION

Figure 4:
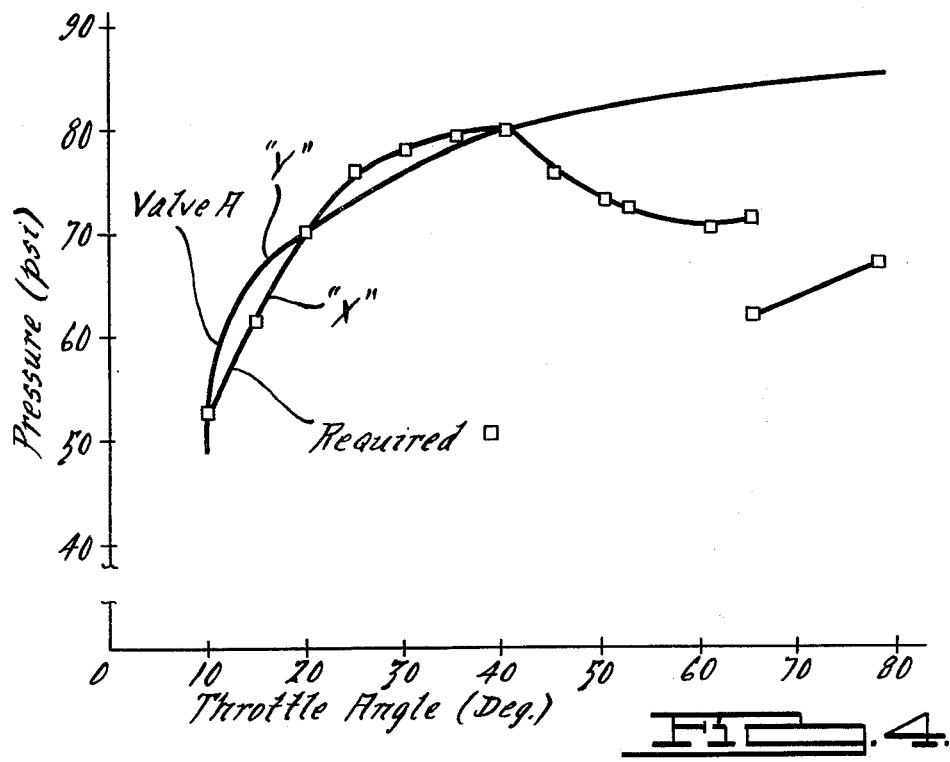
FIG. 4 is a chart that shows the relationship between engine throttle angle, which is an indicator of engine torque, and the clutch pressure required for any given throttle position. Superimposed on FIG. 4 is the actual clutch pressure during a shift interval made available to the clutch when the valve of FIG. 3 is present in the valve circuit.

In FIG. 1 an internal combustion engine for a vehicle is shown at 10 and a vehicle driveshaft is shown at 12, the latter being connected to vehicle traction wheels 14 through a differential and axle assembly. The engine crankshaft 16 is connected to the driveshaft 12 by means of a torque converter 18 and multiple ratio gearing 20. The converter 18 includes a bladed impeller 22 connected to the crankshaft 16, a bladed turbine 24 and a bladed stator 26. The turbine 24 is connected to turbine shaft 28 and the stator 26 is anchored against rotation in one direction by overrunning brake 30 which is supported by a stationary sleeve shaft 32.

Gearing 20 includes two planetary gear units, the first of which includes a ring gear 34, sun gear 36, planet carrier 28 and planet pinions 40 carried by the carrier 38. The second simple planetary gear unit includes ring gear 42, sun gear 36 which is common to the first planetary gear unit, carrier 44 and planet pinions 46 carried by the carrier 44. The carrier 44 is connected to a brake drum about which is positioned brake band 48 which acts as a torque reaction point during reverse drive and during low speed ratio operation with the vehicle in a coasting mode. The carrier 44 is anchored against rotation in the opposite direction by one way brake 50 which establishes a torque reaction point during low speed ratio operation in a forward driving direction.

A direct-and-reverse clutch 52 is adapted to provide selectively a connection between the turbine shaft 28 and drive shell 54 which is secured to the sun gear 36. To effect a connection between the turbine shaft 28 and ring gear 34 during operation in each of the forward drive ratios, clutch 56 is engaged.

Clutch 52 includes an annular clutch cylinder 58 which defines a brake drum about which is positioned a brake band 60. Brake band 60 is applied to effect a ratio change from the low speed ratio to the intermediate speed ratio while forward drive clutch 56 is applied. A ratio change from the intermediate ratio to a direct drive ratio is obtained by releasing brake band 60 and pressurizing the cylinder 58 which engages the clutch 52 thereby establishing a driving connection between the turbine shaft 28 and the sun gear 36. An annular piston 62 is situated in the cylinder 58 and cooperates with it to define a chamber 64. The improved valve system of our invention is designed to prevent undesirable centrifugal clutch pressure build up in the chamber 64.

Brake band 60 is adapted to be applied and released by an intermediate servo schematically illustrated in FIG. 1. It comprises a piston 66 situated in a cylinder 68. The piston 66 is connected mechanically by brake operator 70 to the operating end of the brake band 60, the other end being anchored. Two pressure chambers are defined by the piston and the cylinders and these are supplied by fluid pressure through passage 72 and passage 74, the former communicating with the brake apply side of the piston and the latter communicating with the brake release side of the piston. When both pressure chambers are pressurized, the brake band 60 is released. When passage 74 is exhausted when passage 72 remains pressurized, the brake band becomes applied.

Fluid pressure operated servo 76 actuates brake band 48 and it includes a single acting servo piston 78 operating in a servo cylinder 80 which is supplied with operating fluid through passage 82.

The fluid passage that supplies fluid to the pressure chamber 64 is illustrated schematically at 84 and the passage that supplies fluid to the clutch 56 is shown schematically at 86.

A governor assembly 88 is connected to the driveshaft 12 and rotates with it to develop a pressure that is used by the shift valves to initiate ratio changes.

The engine 10 includes a carburetor as designated in FIG. 1 which is controlled by a driver operated accelerator pedal 90 as seen in FIG. 2. FIG. 2 also schematically illustrates the principal components of a typical automatic control valve as well as certain details of an accumulator and a clutch capacity valve for modifying the rate of clutch application during a ratio change from the intermediate ratio to the high speed ratio.

A transmission throttle valve 92 is controlled by accelerator pedal 90. It produces a signal that is an indicator of engine torque and that signal is distributed to a main pressure regulator valve 94. This valve 94 regulates pressure from an engine drive positive displacement pump 96 in FIG. 1. The pump 96 is shown connected drivably to the impeller 22.

The housing which encloses the gearing 20 contains a sump 98 from which the pump 96 is supplied with fluid. A driver controlled manual valve 100 can be moved to any one of the driving positions indicated in FIG. 2 to establish the various drive modes. When it is moved to the $D_2$ position, fluid is made available to a 1-2 shift valve 102 and a 2-3 shift valve 104 through the connecting passages. When it is moved to the L position or the R position fluid is distributed to the passage 82 which extends to the apply side of the reverse-and-low servo. A speed signal from the governor 88 is distributed through the connecting passages through the 1-2 shift valve 102 and the 2-3 shift valve 104. Likewise a torque signal is distributed to these valves from the TV boost valve 106 which receives the primary throttle valve pressure from the valve 92. Fluid is applied through the shift valve 102 to the passage 72 that extends to the intermediate servo apply chamber during a shift from the low ratio to the intermediate ratio in response to increasing governor pressure for any given throttle valve pressure. A subsequent shift from the intermediate ratio to the high speed third ratio is controlled by the valve 104 which distributes clutch actuating pressure to the passage 84 which causes the gearing to rotate with a 1-1 ratio if the clutch 56 remains applied. Pressure modifier valve 110, which is shown in detail in FIG. 3, is supplied with fluid from passage 108 upon a 2-3 upshift. The output signal from the modifier valve 110 is distributed to the lower end of an accumulator piston 112 which comprises a small land 114 and a larger land 116. An accumulator spring 118 tends to move the piston 112 in a downward direction. Piston 112 is situated in a double diameter accumulator cylinder defining a large diameter accumulator pressure chamber 120 and a smaller diameter accumulator pressure chamber 122.

The direct-and-reverse clutch feed passage communicates with capacity modulator valve 124 through passage 126. This valve comprises a valve spool 128 having a first land 130 and a second land 132. Valve spring 134 normally urges the capacity modulator valve in a downward direction. When it is positioned in a downward position, passage 126 communicates with a space between the lands 130 and 132 so that communication is established between passage 126 and passage 136 on the upstream side of the control orifice 138. Pressure on the downstream side of the control orifice 138 is distributed to the upper side of land 130 and the upper side of land 116 of the accumulator piston 112. Passage 140 distributes pressure from the passage 136 to the lower end of the land 132. Exhaust port 142 communicates with the chamber for the capacity modulator valve in which the spool 128 is situated so that the capacity modulator valve modifies the pressure in passage 126 upon initial shifting movement of the 2-3 shift valve to the upshift position. At the beginning of the upshift pressure is distributed directly from passage 126 to passage 136, thereby stroking the accumulator piston 112 in a upward direction. The capacity modulator valve regulates the pressure in passage 126, and a controlled flow occurs across the control orifice 138 to cause a gradual pressure build-up in accumulator chamber 120 and on the upper side of the capacity modulator valve. As this occurs, the accumulator piston 112 begins to stroke thereby allowing flow to continue through the control orifice 138. As the accumulator strokes, the shift time is extended since the clutch 52 slowly gains capacity. After the accumulator piston is fully stroked, the clutch pressure rises to its maximum value depending upon the regulated pressure level maintained by the regulator valve 94. In most instances the shift will occur after the cutback valve 144 shown in FIG. 2 distributes primary throttle valve pressure from valve 92 to the regulator valve which causes a regulated pressure level cutback for any given engine throttle setting.

When control pressure is distributed to the lower end of the land 114 of the accumulator valve through passage 146, this control pressure is made available by the valve 110 seen in FIG. 3. This valve comprises a spool 148 having a large land 150 and two smaller lands 152 and 154. Spring 156 normally urges the spool 148 in an upward direction. Line pressure is distributed to the valve through passage 108 at a location adjacent land 152 and the pressure in passage 108 acts on a differential area of lands 150 and 152 to normally urge the valve in an upward direction. Exhaust port 156 is adjacent land 154 so a modulating action occurs. A modulated output pressure is distributed through a feedback passage 158 to the upper side of the land 150 and it is this pressure that is distributed to the passage 146. The diameter of the lands of valve 110 and the rate of spring 156 can be controlled to calibrate appropriately the accumulator and the capacity modulator valve.

In FIG. 4 we have shown a plot that indicates the relationship between the engine carburetor throttle angle, which is an indicator of engine torque, and the clutch pressure for the clutch 52. The pressure in the clutch that is required to maintain the torque capacity is shown by curve "X", but the pressure that actually is made available to the clutch by the circuit of FIG. 2 is shown by the curve "Y". It may be seen in FIG. 4 that the relationship between the curves "X" and "Y" is not constant, especially at high carburetor throttle angle settings. At high throttle settings the required pressures are lower than the actual pressures made available by the valves of FIGS. 2 and 3. It is this discrepancy that causes rough shifts. Part of this discrepancy is due to the effect of the centrifugal pressure build up in the clutch when a 2-3 shift occurs at high throttle angles.

Figure 5:
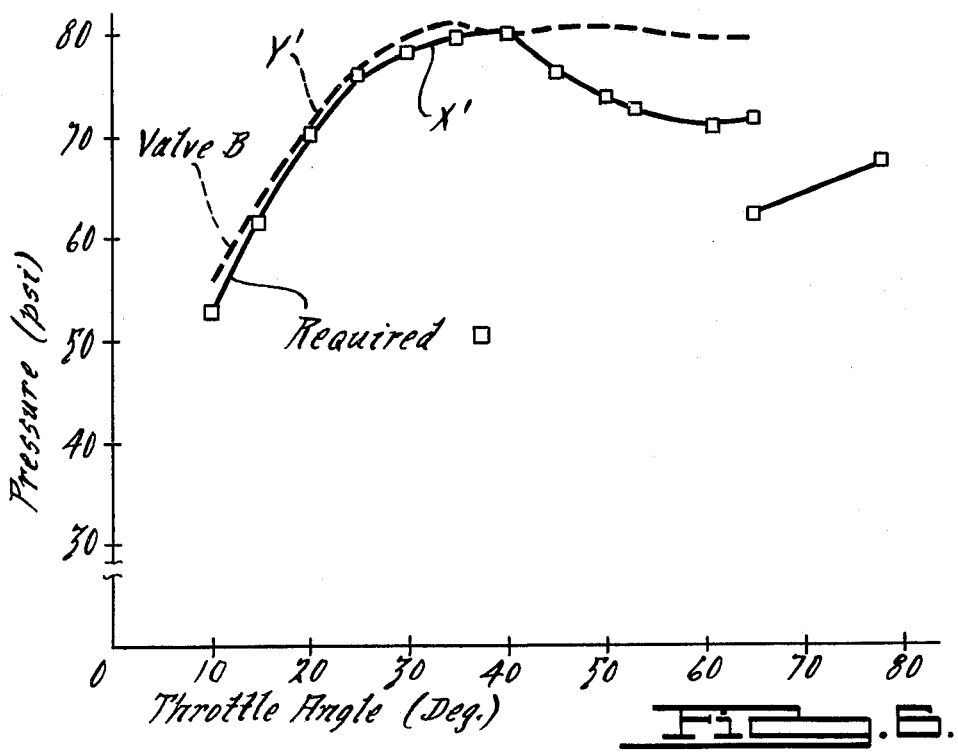
FIG. 5 is a schematic drawing of a timing valve for use in the circuit of FIG. 2 wherein provision is made for modifying the clutch accumulator characteristics in response to changing speed as measured by the governor pressure.

In FIG. 5 we have shown a governor pressure sensitive pressure modifier valve 210. It includes valve spool 212 with four spaced valve lands designated by reference characters 214, 216, 218 and 220. The valve spool 212 is urged in a left hand direction by valve spring 222. Each land is slidably received in a matching diameter portion of a valve chamber. Modified line pressure is distributed to the left hand side of land 214. Line pressure is distributed to passage 224 adjacent land 218. Exhaust port 226 is located adjacent land 260. Modified output pressure is distributed to the accumulator through passage 228 which corresponds to the passage 146 in the embodiment of FIG. 2.

Valve 210 functions in a manner similar to the operation of the valve in FIG. 3 except that governor pressure is introduced to the differential area of lands 218 and 220 through governor pressure passage 230 to supplement the force of spring 222. When the governor pressure is increased, a corresponding reduction occurs in the modulated pressure in passage 228. This then, of course, affects the calibration of the accumulator and the rate of increase of the clutch pressure in clutch 52 during a 2-3 upshift.

FIG. 6 is a plot showing the actual pressures and the required pressures for the clutch for various throttle angle settings. It correponds to FIG. 4, but the actual pressures made available to the clutch, which is represented by curve "Y'", follows more closely the required pressures, which is represented by curve "X'". It should be noted that curve "Y'" has a flat characteristic at large throttle angles rather than the rising characteristic seen in FIG. 4 for corresponding large throttle angles.

In FIG. 7 we have shown a governor pressure booster valve which is designed to augment the magnitude of the pressure made available to the modifier valve 210. Governor pressure is distributed to the valve of FIG. 7 through governor pressure passage 300 and line pressure is distributed to the valve of FIG. 7 through passage 302. The valve comprises a valve spool 304 having a large land 306 and a small land 308. Valve spring 310 urges the valve in an upward direction. The pressure acting on the differential area of lands 306 and 308 is a governor pressure. At high governor pressures the differential pressure force is sufficient to overcome the force of the spring 310 thereby providing controlled communication between passage 302 and governor signal passage 312 which is distributed to passage 230 of the pressure modifier valve shown in FIG. 5 thereby augmenting the effect of speed on the output pressure signal in passage 228.

The result of the use of the pressure booster of FIG. 7 is shown in the plot of FIG. 8. The actual pressure made available to the clutch by a system that employs the valves of FIGS. 5 and 7 is shown at "Y''''" in FIG. 8. The required pressures for the clutch to maintain the delivered torque is shown by the curve "X''''" in FIG. 8. It should be noted in FIG. 8 that the curves "Y''''" and "X''''" correspond rather closely, especially at the portion of the curve corresponding to high throttle angles. This is in contrast especially to the plot of FIG. 4 where the actual pressure made available to the clutch increased at high throttle angles and deviates sharply from the required pressures for the clutch. With the required pressures corresponding more closely to the actual pressures, excessive pressures for the clutch during a shift interval is avoided and the quality of the shift is approved correspondingly.

Figure 9:
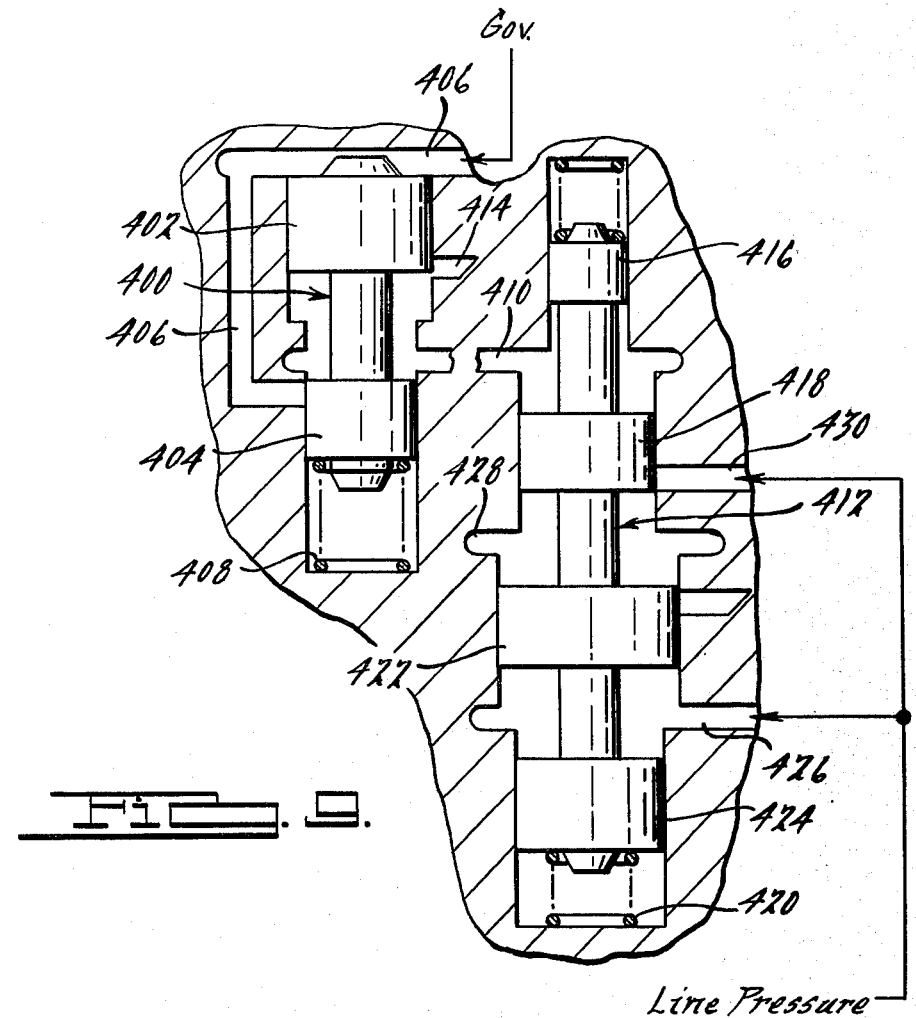
FIG. 9 shows a timing valve that may be used in the circuit of FIG. 2 in combination with a governor pressure cut out valve that eliminates the influence of governor pressure when the speed of the vehicle is below a specified value.

In FIG. 9 we have shown an alternate valve arrangement for modifying the pressure made available to the modifier valve. Unlike the valve of FIG. 7 which functions as a governor pressure booster, the valve of FIG. 9 has a governor pressure limiting valve which interrupts distribution of pressure from the governor to the modifier valve at lower speeds but allows pressure to be distributed to the modifier valve at higher speeds. This in effect will produce the same kind of characteristic curve as that illustrated in FIG. 8 where the actual clutch pressures closely match the required clutch pressures for all angle settings of the engine throttle.

The governor limiter valve of FIG. 9 is shown at 400 and it comprises a valve spool having a large land 402 and a small land 404. Governor pressure from the governor 88 is distributed to the upper side of land 402 through passage 406. Spring 408 normally urges the spool in an upward direction. The spring force is opposed by the effective pressure force of the governor pressure acting on the upper end of the land 402.

At low speeds the governor pressure force is insufficient to overcome the force of the spring 408. This interrupts distribution between governor pressure passage 406 and passage 410 which communicates with the modifier valve 412. When a minimum governor pressure is reached to cause the valve 400 to modulate, a pressure begins to build up in passage 410. Modulating action occurs as exhaust port 414 begins to be restricted and passage 406 begins to be opened.

The pressure made available to the valve 412 through passage 410 acts on the differential area of lands 416 and 418. This produces a pressure force that opposes the force of valve spring 420 at the lower end of the valve 412.

Valve 412 includes also lands 422 and 424. Line pressure in port 426 supplements the force of spring 420. The force of spring 420 and the force of line pressure acting on the differential area of lands 422 and 424 is opposed by the modulated output pressure in port 428 which acts on the differential area of lands 418 and 422. Ports 426 and 430 are connected together. Port 428 communicates with the lower end of the accumulator through passage 146 of the circuit shown in FIG. 2.

Figure 10:
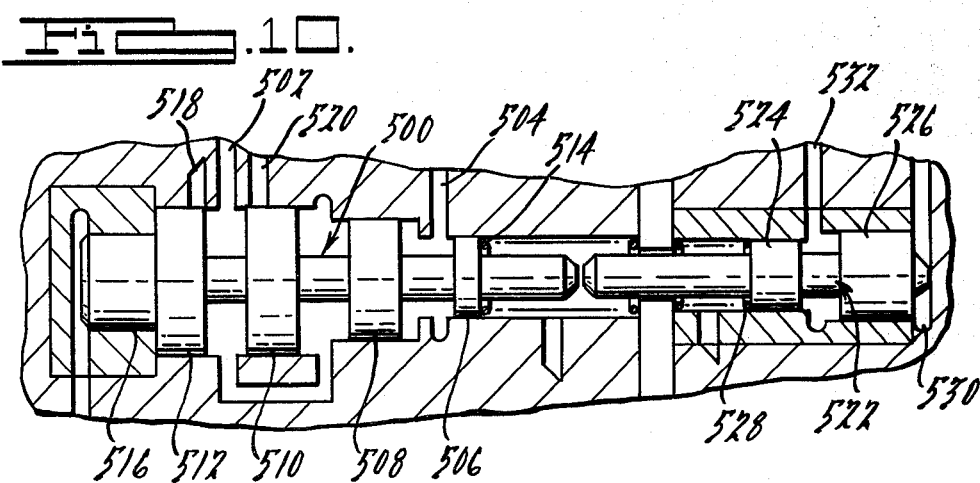
FIG. 10 shows a timing valve for use in the valve circuit of FIG. 2 in combination with a governor pressure booster valve that acts directly on the regulating portions of the valve.

In FIG. 10 we have shown still another alternate construction for the pressure modifier valve. It is designated by reference character 500 and it is effective, as in the case of the other modifier valves, to produce a modified pressure in passage 502 which extends to passage 146 of the circuit of FIG. 2. Governor pressure is distributed to the valve 500 through governor pressure passage 504 and that governor pressure acts on the differential area of lands 506 and 508.

Valve 500 includes also spaced valve lands 510 and 512, the differential area of lands 508 and 510 being subjected to a modulated output pressure in passage 502 to supplement the force of the spring 514.

Line pressure is distributed to the left hand side of the smaller land 516 to oppose the force of the spring 514. Exhaust port 518 is located adjacent land 512 so that the pressure supplied to the valve 500 through line pressure passage 520 is modulated by the valve.

A governor pressure booster 522 is located in line with the valve 500. It includes spaced lands of differential diameter as shown at 524 and 526. It is urged in a right hand direction by valve spring 528. Throttle valve pressure acts on the right hand side of the land 526, that part of the valve communicating with the output side of the throttle valve 92 through passage 530.

At high throttle settings for any given governor pressure the force of the spring 528 will be overcome and the valve 522 will engage directly the valve 500. Each valve has an elongated stem, as indicated in FIG. 10, so that the stems engage each other when the valve 522 is shifted in a right hand direction, and at advanced throttle settings corresponding to the settings above the 40° mark indicated in FIG. 8 the output pressure in port 502 will be decreased for any given carburetor setting. The point at which the boost valve 522 has an influence is determined also by the magnitude of the governor pressure supplied to the differential area of lands 524 and 526 through governor passage 532.

Having thus described preferred embodiments of our invention, what we claim and desired to secure by U.S. Letters Patent is:

1. In an automatic power transmission mechanism having relatively movable gear elements that define plural torque delivery paths between a driving member and a driven member;
    a fluid pressure operated clutch adapted to connect two torque delivery elements of said driveline together to effect a torque ratio change;
    a fluid pressure source, conduit means including a high pressure portion connecting for pressure source to said clutch and including also a shift valve for distributing fluid pressure to and for exhausting fluid pressure from said clutch; and
    an accumulator valve means in communication with a portion of the conduit structure that communicates with the clutch for delaying and cushioning the application of the clutch upon movement of the shift valve to effect clutch engagement and a pressure modifier valve means communicating with said high pressure portion of said conduit means for establishing a modulated pressure;
    said pressure modifier valve means being in communication with said accumulator valve means whereby the latter is subjected to the modulated pressure to change the calibration of the accumulator valve means whereby it compensates for the effect of a centrifugal pressure build up in said clutch.

2. In an automatic power transmission having relatively movable gear elements that define plural torque delivery paths between a driving member and a driven member;
    a fluid pressure operated clutch adapted to connect two torque delivery elements of said driveline together to effect a torque ratio change;
    a fluid pressure source, conduit means including a high pressure portion connecting the pressure source to said clutch and including also a shift valve for distributing fluid pressure to and for exhausting fluid pressure from said clutch;
    an accumulator valve means in communication with a portion of the conduit structure that communicates with the clutch for delaying and cushioning the application of the clutch upon movement of the shift valve to effect clutch engagement and a pressure modifier valve means communicating with said high pressure portion of said conduit means for establishing a modulated pressure.
    said pressure modifier valve means being in communication with said accumulator valve means whereby the latter is subjected to a modulated pressure to change the calibration of the accumulator valve means whereby it compensates for the effect of a centrifugal pressure build up in said clutch; and
    fluid pressure governor valve means connected to driven portions of said transmission for developing a pressure signal that is related proportionally to the speed of said driven member;
    said governor valve means being in fluid communication with said modifier valve means whereby the modulated pressure established by said modifier valve means is changed upon a change in driven speed so that the rate of pressure build up during a shift interval is reduced during a ratio change at high speeds to compensate for the effect of the centrifugal pressure build up in said clutch.

3. The combination as set forth in claim 1 wherein said accumulator means comprises an accumulator piston movable in an accumulator cylinder and spring biased in one direction, the clutch being in fluid communication with said cylinder on one side of said piston whereby clutch pressure opposes the forces of said spring and causes said piston to stroke upon an increase in clutch pressure;
    a flow restricting orifice in said circuit between said clutch in the other side of said piston; and
    a capacity modulator valve for controlling the rate of flow of fluid through said orifice.

4. The combination as set forth in claim 2 wherein said accumulator means comprises an accumulator piston movable in an accumulator cylinder and spring biased in one direction, the clutch being in fluid communication with said cylinder on one side of said piston whereby clutch pressure opposes the forces of said spring and causes said piston to stroke upon an increase in clutch pressure;

a flow restricting orifice in said circuit between said clutch in the other side of said piston; and a capacity modulator valve for controlling the rate of flow of fluid through said orifice.

5. The combination as set forth in claim 2 wherein said pressure modifier valve comprises a valve chamber, a valve spool slidably received in said valve chamber and communicating with said high pressure portion of said conduit means and an exhaust port communicating with said valve chamber;

spring means for biasing said valve spool in one direction, the modulated pressure developed by said pressure modifier valve acting on said valve spool to establish a pressure force that opposes the force of said spring and a governor land on said valve spool in communication with said governor valve means thereby developing a pressure force that complements the force of said spring;

the modulated output pressure of said pressure modifier valve acting on said accumulator valve means to oppose the force of the spring acting on said accumulator valve means.

6. The combination as set forth in claim 3 wherein said pressure modifier valve comprises a valve chamber, a valve spool slidably received in said valve chamber and communicating with said high pressure portion of said conduit means and exhaust port communicating with said valve chamber;

spring means for biasing said valve spool in one direction, the modulated pressure developed by said pressure modifier valve acting on said valve spool to establish a pressure force that opposes the force of said spring and a governor land on said valve spool in communication with said governor valve means source thereby developing a governor pressure force that complements the force of said spring;

the modulated output pressure of said pressure modifier valve acting on said accumulator valve means to oppose the force of the spring acting on said accumulator valve means.

7. The combination as set forth in claim 4 wherein said pressure modifier valve comprises a valve chamber, a valve spool slidably received in said valve chamber and communicating with said high pressure portion of said conduit means and exhaust port communicating with said valve chamber;

spring means for biasing said valve spool in one direction, the modulated pressure developed by said pressure modifier valve acting on said valve spool to establish a pressure force that opposes the force of said spring and a governor land on said valve spool in communication with said governor valve means source thereby developing a pressure force that complements the force of said spring;

the modulated output pressure of said pressure modifier valve acting on said accumulator valve means to oppose the force of the spring acting on said accumulator valve means.

8. The combination as set forth in claim 4 wherein said governor valve means comprises a governor pressure booster valve means for augmenting the magnitude of said governor pressure thereby making the accumulator more sensitive to speed and increasing the compensation for centrifugal pressure build up during shift intervals under higher torque.

9. The combination as set forth in claim 5 wherein said governor valve means comprises a governor pressure booster valve means for augmenting the magnitude of said governor pressure thereby making the accumulator more sensitive to speed and increasing the compensation for centrifugal pressure build up during shift intervals under higher torque.

10. The combination as set forth in claim 4 wherein said governor valve means includes a governor limiter for interrupting distribution of governor pressure to said pressure modifier valve at driven speeds of said driven member less than a selected value.

11. The combination as set forth in claim 5 wherein said governor valve means includes a governor limiter for interrupting distribution of governor pressure to said pressure modifier valve at driven speeds of said driven member less than a selected value.

* * * * *